United States Patent
Chen et al.

(10) Patent No.: US 6,690,822 B1
(45) Date of Patent: Feb. 10, 2004

(54) METHOD FOR DETECTING SKIN COLOR IN A DIGITAL IMAGE

(75) Inventors: Shoupu Chen, Rochester, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 643 days.

(21) Appl. No.: 09/692,930

(22) Filed: Oct. 20, 2000

(51) Int. Cl.[7] .............................. G06K 9/00; G06K 9/38; G06K 9/62; G06K 9/20
(52) U.S. Cl. ..................... 382/162; 382/272; 382/172; 382/228; 382/283
(58) Field of Search ................................. 382/118, 162, 382/164, 165, 167, 172, 224, 228, 270, 272, 276, 282, 283, 291, 295; 358/462, 515, 518, 523, 530

(56) References Cited

U.S. PATENT DOCUMENTS

| | | | |
|---|---|---|---|
| 4,203,671 A | | 5/1980 | Takahachi et al. .......... 356/402 |
| 5,128,711 A | | 7/1992 | Terashita et al. ............... 355/41 |
| 5,585,860 A | * | 12/1996 | Takeshima .................. 348/652 |
| 5,715,377 A | * | 2/1998 | Fukushima et al. ............ 358/1.9 |
| 5,850,463 A | * | 12/1998 | Horii ............................ 382/118 |
| 5,940,530 A | * | 8/1999 | Fukushima et al. .......... 382/164 |
| 6,072,526 A | * | 6/2000 | Hashimoto et al. ....... 348/223.1 |
| 6,249,317 B1 | * | 6/2001 | Hashimoto et al. .......... 348/364 |
| 6,343,141 B1 | * | 1/2002 | Okada et al. ................ 382/118 |
| 6,611,613 B1 | * | 8/2003 | Kang et al. .................. 382/118 |

* cited by examiner

Primary Examiner—Andrew W. Johns
Assistant Examiner—Amir Alavi
(74) Attorney, Agent, or Firm—David M. Woods

(57) ABSTRACT

A method for detecting skin color in a digital image having pixels in an RGB color space generally includes the steps of performing statistical analysis of the digital color image to determine the mean RGB color values; then, if the mean value of any one of the colors is below a predetermined threshold, applying a transformation to the digital image to move skin colors in the image toward a predetermined region of the color space; and employing the transformed space to locate the skin color pixels in the digital color image. More specifically, if the mean value of any one of the colors is below a predetermined threshold, a non-linear transformation is applied to the digital image to move skin colors in the image toward a predetermined region of the color space. Then, depending on the preceding step, either the digital image or the transformed digital image is converted from the RGB space to a generalized RGB space to produce a gRGB digital image; skin color pixels are detected within the gRGB digital image; a first skin color image mask is formed based on the detected skin color pixels; a masked gRGB image is generated using the first skin color image mask; and finally the skin color image mask is employed to locate the skin color pixels in the digital color image.

15 Claims, 6 Drawing Sheets

METHOD FOR DETECTING SKIN COLOR IN A DIGITAL IMAGE

CROSS-REFERENCE TO RELATED APPLICATION

Reference is made to commonly assigned copending application Ser. No. 09/692,929, entitled "Method For Blond-Hair-Pixel Removal in Image Skin-Color Detection", in the names of Shoupu Chen and Lawrence A. Ray, and filed on even date herewith.

FIELD OF THE INVENTION

The present invention relates to digital image processing methods, and more particularly to such methods for detecting skin color in a digital image.

BACKGROUND OF THE INVENTION

In digital image processing it is often useful to detect the areas in the image that are skin color. This information is used, for example, to adjust the skin colors in the image to be pleasing. The location of skin color is also used in face detection and recognition algorithms, automatic image retrieval algorithms, and red-eye correction algorithms. For instance, U.S. Pat. No. 4,203,671, issued May 20, 1980 to Takahashi et al., discloses a method of detecting skin color in an image by identifying pixels falling into an ellipsoid in red, green, blue color space or within an ellipse in two dimensional color space. The problem with this method is that it works well only when an image is properly balanced. For an over- or under-exposed image, the technique is not reliable. Furthermore, the technique does not work well for those skin colors that deviate from the chosen norm. For example, when the detection method is adjusted to detect light Caucasian skin, it fails to properly detect dark skin.

There is a need therefore for an improved skin color detection method that avoids the problems noted above.

SUMMARY OF THE INVENTION

The present invention is directed to overcoming one or more of the problems set forth above. Briefly summarized, according to one aspect of the present invention, a method for detecting skin color in a digital image having pixels in an RGB color space generally includes the steps of performing statistical analysis of the digital color image to determine the mean RGB color values; then, if the mean value of any one of the colors is below a predetermined threshold, applying a transformation to the digital image to move skin colors in the image toward a predetermined region of the color space; and employing the transformed space to locate the skin color pixels in the digital color image.

More specifically, if the mean value of any one of the colors is below a predetermined threshold, a non-linear transformation is applied to the digital image to move skin colors in the image toward a predetermined region of the color space. Then, depending on the preceding step, either the digital image or the transformed digital image is converted from the RGB space to a generalized RGB space to produce a gRGB digital image; skin color pixels are detected within the gRGB digital image; a first skin color image mask is formed based on the detected skin color pixels; a masked gRGB image is generated using the first skin color image mask; the masked gRGB image is converted to a hue image; possible blond hair color pixels are removed from the hue image to produce a modified hue image; a second skin color image mask is formed based on the skin color pixels in the modified hue image; if the second skin color image mask is smaller than the first skin color image mask by a predetermined amount, then the first skin color image mask is selected, otherwise, the second skin color image mask is selected; and finally the selected skin color image mask is employed to locate the skin color pixels in the digital color image.

The advantage of the invention is that it works well even when an image is not properly balanced, and furthermore works well for a variety of skin colors.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image processing algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements known in the art. In the following description, a preferred embodiment of the present invention will typically be implemented as software or a computer program. Those skilled in the art will readily recognize that the equivalent of such software may also be constructed in hardware. Given the method as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
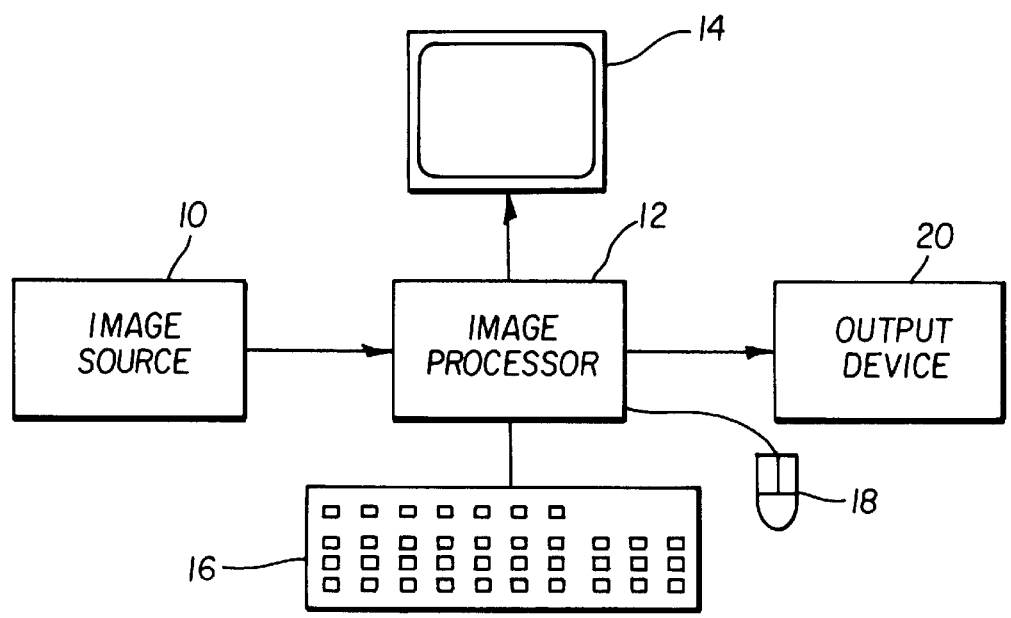
FIG. 1 is a schematic diagram of an image processing system useful in practicing the present invention.

Referring first to FIG. 1, an image processing system useful in practicing the present invention includes a color digital image source 10, such as a film scanner, digital camera, or digital image storage device such as a compact disc drive with a Picture CD. The digital image from the digital image source 10 is provided to an image processor 12, such as a programmed personal computer, or digital image processing workstation such as a Sun Sparc 20 workstation. The image processor 12 may be connected to a CRT display 14, and an operator interface such as a keyboard 16 and a mouse 18. The processed digital images are sent to an output device 20, such a hard copy printer, a long-term image storage device, a connection to another processor, or an image telecommunication device connected for example to the internet.

Figure 2:
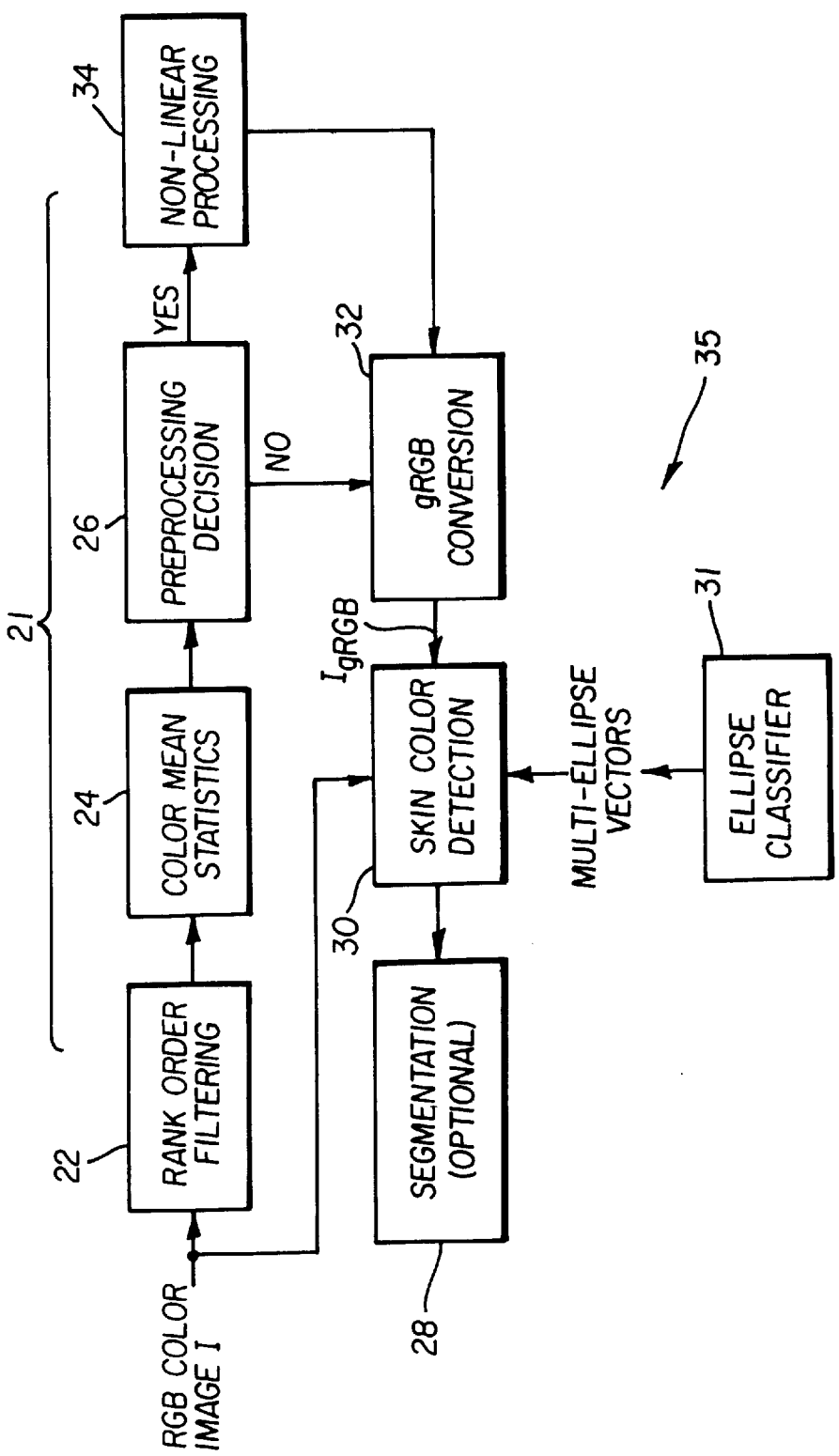
FIG. 2 is a flow chart illustrating the method stages of the present invention.

Referring to FIG. 2, the processing performed according to the present invention by the digital image processor 12 will be described. The digital image, expressed in a device independent RGB color space such as sRGB color space is first rank order filtered in a rank order filter step 22. Denote the input RGB image by I={$C_i$}, where i=1,2,3 for three color-channels, and $C_i$ is a matrix with elements of $C_i(m,n)$, where m=0, . . . M−1 and n=0, . . . N−1. The rank-order filtering is defined as $$C_i(m,n)|_{C_i(m,n) \in \check{C}_i} = \text{median}(C_i(s,t) \in \hat{C}_i)|_{s,m \in (0,M-1); n,t \in (0,N-1); s=m; t=n} \quad (1)$$

where $\check{C}_i$ is the set of $C_i(m,n)$ whose value exceeds a predefined threshold $T_{Rank}$ while $\hat{C}_i$ is the set of the remaining $C_i(m,n)$ of I. This operation is similar to the traditional process of trimmed median filtering. Notice that the purpose of this rank-order filtering is not to improve the visual quality of the input image as traditional image processing does; rather, it is to reduce the influence of the pixels that have very high intensity values on the subsequent statistics gathering stage 24. For instance, in situations such as over exposure, or back lit exposure, pixels with values close to 255 will be altered or excluded in the mean value calculation. The resultant image of the rank-order filtering can be denoted by $I_R=\{\hat{C}_i, \check{C}_i\}$, where the elements of $\hat{C}_i$ have the original values, and the elements of $\check{C}_i$ have the values computed using Equation 1. For simplicity, rewrite the rank-order filtered image as $I_R=\{\tilde{C}_i\}$ where $\tilde{C}_i = \hat{C}_i \cup \check{C}_i$.

The next step is to compute the color mean-statistics in a statistics step 24 for each color channel using $I_R$. This computation produces a set of mean values, that is, $\{m_i\}$= mean($I_R$); where $m_i$=mean($\tilde{C}_i$). A pre-processing decision step 26 is made upon evaluating the mean statistics $\{m_i\}$. If there exits $m_i < T_M$, then the pre-processing decision is 'Yes', where the threshold $T_M$ is an experimentally determined value; for example, for an 8-bit image, a value of 100 has been found to be acceptable.

If the pre-processing decision is 'Yes', then the process will go to a non-linear processing step 34. The input to the non-linear processing step is the original RGB image I. The non-linear processor employed in this invention is color histogram equalization, which is an image processing technique well known to those of skill in this art and thoroughly described in the literature (e.g., see "Digital Image Processing", by Gonzalez and Woods, Addison-Wesley Publishing Company, 1992). The input image I is first converted to YIQ space to separate the luminance component and chromaticity components using the standard formula:

$$\begin{bmatrix} Y \\ I \\ Q \end{bmatrix} = \begin{bmatrix} 0.299 & 0.587 & 0.114 \\ 0.569 & -0.274 & -0.322 \\ 0.211 & -0.523 & 0.312 \end{bmatrix} \begin{bmatrix} C_1 \\ C_2 \\ C_3 \end{bmatrix} \quad (2)$$

The histogram equalization process is applied to Y only, resulting in an equalized luminance Y'. The reverse mapping from the YIQ to RGB is done by $$\begin{bmatrix} C'_1 \\ C'_2 \\ C'_3 \end{bmatrix} = \begin{bmatrix} 1.000 & 0.956 & 0.621 \\ 1.000 & -0.273 & -0.647 \\ 1.000 & -1.104 & 1.701 \end{bmatrix} \begin{bmatrix} Y' \\ I \\ Q \end{bmatrix} \quad (3)$$

An important issue in color histogram equalization is saturation clipping. Remember that the equalization result Y' could cause $C'_i$ to either exceed 255 or becomes less than 0. To prevent this from happening, a clipping procedure is used on $C'_i$. The pseudo code for clipping saturation is as follows:

$$\begin{aligned}
&\text{if } C'_1 > 255; k_1 = 255/C'_1 \\
&\text{else if } C'_1 < 0; C'_1 = 0; \\
&\text{if } C'_2 > 255; k_2 = 255/C'_2 \\
&\text{else if } C'_2 < 0; C'_2 = 0; \\
&\text{if } C'_3 > 255; k_3 = 255/C'_3 \\
&\text{else if } C'_3 < 0; C'_3 = 0; \\
&k = \min(k_1, k_2, k_3) \\
&C'_1 = kC'_1, C'_2 = kC'_2, C'_3 = kC'_3
\end{aligned} \quad (4)$$

where k, $k_1$, $k_2$ and $k_3$ are initialized to zero.

If the pre-processing decision is "No", the original image I is sent to the gRGB conversion step 32.

In summary, the initialization stage 21 sends an image to a skin-color detection stage 35 depending on the pre-processing decision; either the original image I or the histogram-equalized image I' is sent to the gRGB conversion step 32. To unify the notation, define $I_{RGB}=\{C_i\}$, where i=1,2,3 for three color-channels, and $C_i$ is a matrix with elements of $C_i(m,n)$, where m=0, . . . M−1 and n=0, . . . N−1. Both the original image and the histogram-equalized image are denoted by $I_{RGB}$ from now on.

Still referring to FIG. 2, the input RGB image $I_{RGB}$ is converted in the gRGB Conversion step 32 to a generalized RGB image, $I_{gRGB}$, which is defined as $I_{gRGB}=\{c_i\}$, and $c_i$ is a matrix with elements of $c_i(m,n)$, where m=0, . . . M−1 and n=0, . . . N−1. The conversion uses the formula:

$$c_j(m,n) = \frac{C_j(m,n)}{\sum_i C_i(m,n)} \bigg| j \in i = [1, 2, 3]; \quad (5)$$

$$m = [0, \ldots M-1]; n = [0, \ldots N-1]$$

where $C_i$ is the individual color channel (R, G, or B) of the input image. This conversion operation is not valid when $$\sum_i C_i = 0,$$

and the output will be set to zero. The resultant three new elements are linearly dependent, that is $$\sum_j c_j = 1,$$

so that only two elements are needed to effectively form a new space (gRG plane) that is collapsed from three dimensions to two dimensions. In most cases, $c_1$ and $c_2$, that is, the generalized R and G, are used in skin color analysis and skin color detection. The skin colors in the image $I_{gRGB}$ are detected in a skin color detection step 30 that receives multiple ellipse vectors from an ellipse classifier 31. The ellipse classifier 31 is trained on a large population of images beforehand, which will be discussed below with reference to FIG. 7. The detected skin colors may then be optionally segmented in a segmentation step 28.

Figure 3:
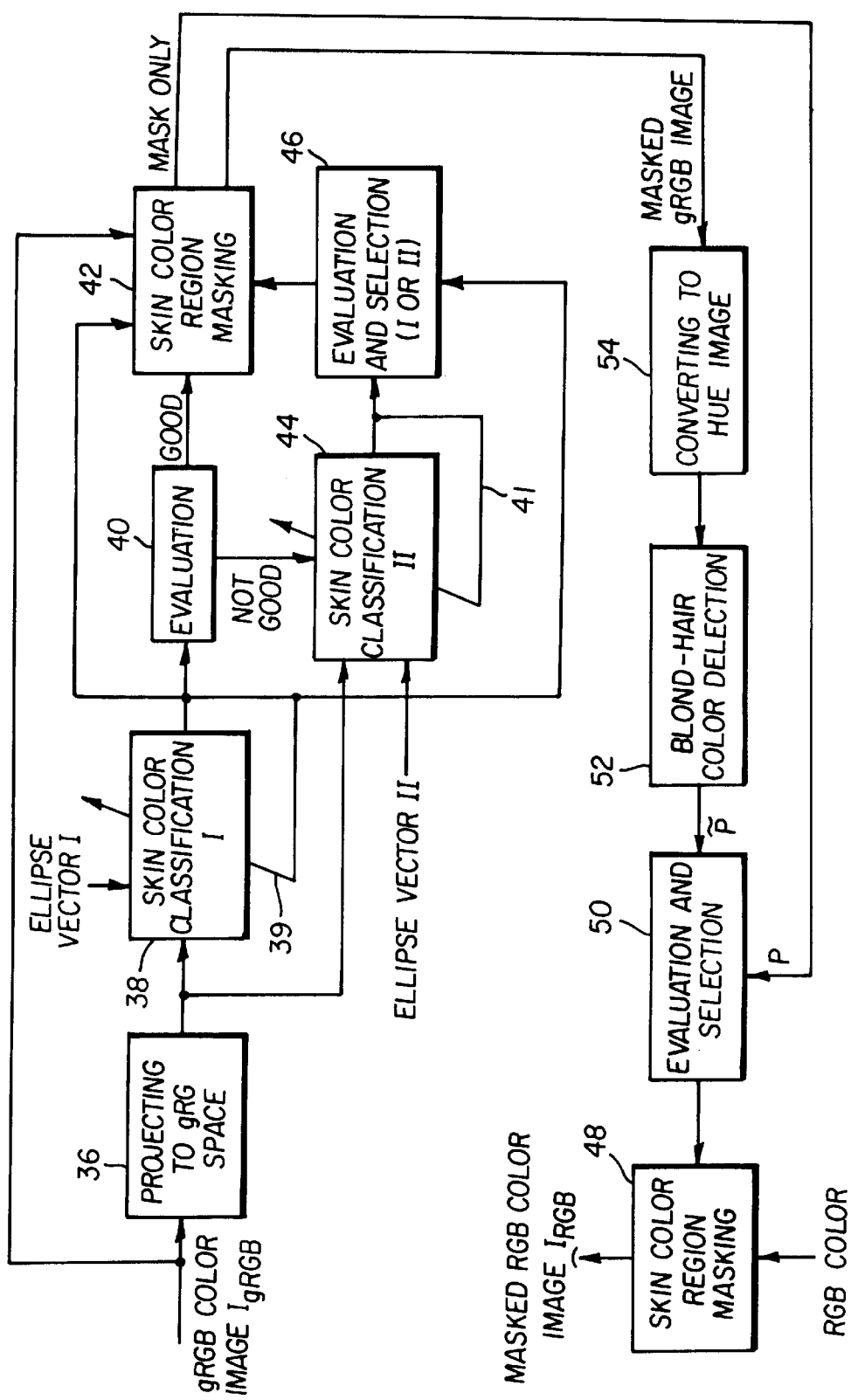
FIG. 3 is a detailed flow chart illustrating the skin color detection step shown in FIG. 2.
Figure 4:
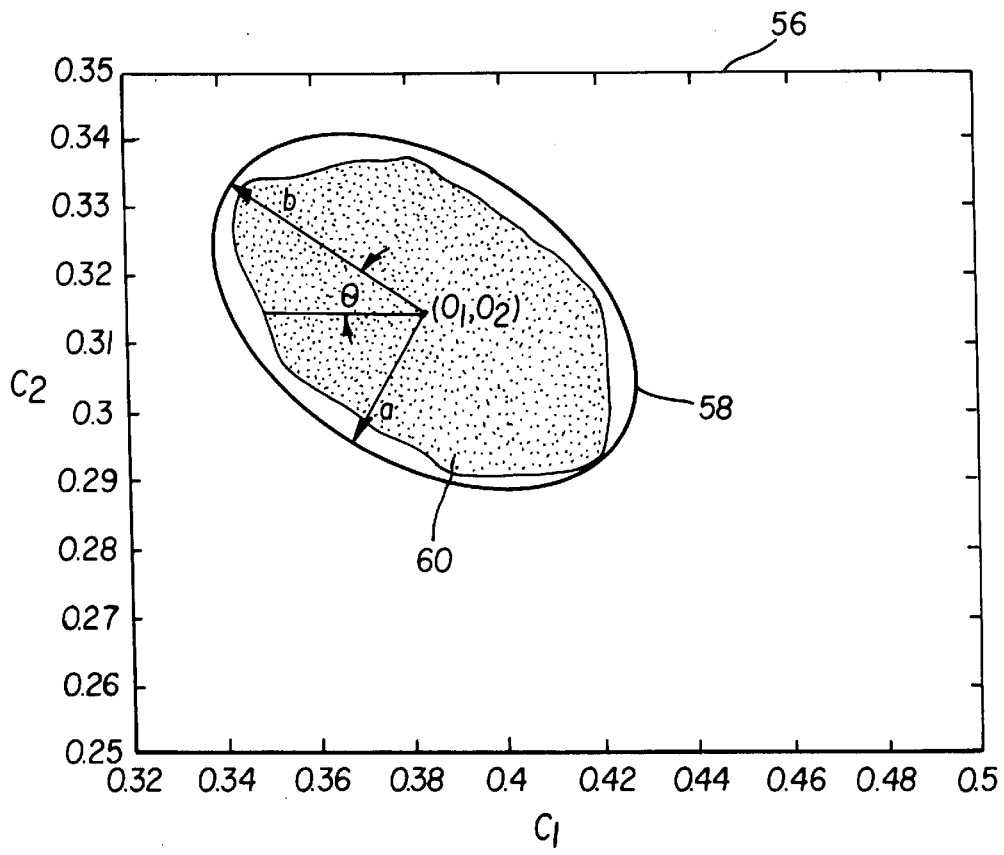
FIG. 4 shows an example of an ellipse classifier in two dimensional color space.

The skin-color detection step 30 is shown in more detail in FIG. 3. The generalized RGB image $I_{gRGB}$ is first projected on to the gRG plane in the in a projection step 36. This projection produces a gRG image $I_{gRG}$. The projection is affected by simply removing the component $c_3$ from the gRGB image. The gRG image $I_{gRG}$ with two components $c_1$ and $c_2$ is then passed to a first (I) skin color classifier 38 which receives a first ellipse vector (ellipse vector I) as shown in FIG. 3. FIG. 4 illustrates an example of an ellipse 58 in gRG color space 56 that is used to designate a region in which skin color pixels are located. The dark region 60 in FIG. 4 is the actual skin-color pixel area. Parameters a, b, $(o_1,o_2)$, and $\theta$ are the constants of the ellipse and define the ellipse vector produced by the ellipse classifier 31. Parameters a and b are the ellipse axes length, $(o_1,o_2)$ is the center coordinates of the ellipse in the $(c_1,c_2)$ space 56, and $\theta$ is the angle between the $c_1$ axis and the longer axis of the ellipse.

For the first skin-color classifier 38, define an intermediate skin-color mask $P_I=\{p_I(i,j)\}_{M\times N}$, that is, an M×N matrix with elements p(i,j). For each pixel of the generalized RG image $I_{gRG}$, define an evaluation function $E(c_1(i,j), c_2(i,j))$, where $i=0,\ldots M-1; j=0,\ldots N-1, c_1(i,j) \in [0,1]; c_2(i,j) \in [0,1]$. The classification is simply performed as:

$$p_I(i,j) = \begin{cases} 1 & \text{if } E(c_1(i,j), c_2(i,j)) < 1 \\ 0 & \text{else} \end{cases} \quad (6)$$

where "1" indicates a skin-color pixel and "0" a non-skin color pixel, and $$E(c_1(i,j),c_2(i,j))=x_{ij}^2/a^2+y_{ij}^2/b^2 \quad (7)$$

and $$x_{ij}=(c_1(i,j)-o_1)\cos(\theta-\pi/4)-(c_2(i,j)-o_2)\sin(\theta-\pi/4)$$

$$y_{ij}=(c_1(i,j)-o_1)\sin(\theta-\pi/4)-(c_2(i,j)-o_2)\cos(\theta-\pi/4) \quad (8)$$

The intermediate skin-color mask, $P_I$, is passed to an evaluation step 40. The evaluation procedure simply computes the ratio, $\gamma_I$, of the number of detected skin pixels to the image size. The evaluation step 40 has two branches. If $\gamma_I \geq T_\gamma$, that is, the evaluation result is 'Good', then the process branches to a skin color region masking step 42. In this case, the output from the first skin color classification step 38, $P_I$, is used for masking the $I_{gRGB}$ in the skin color region masking step 42. The output of the skin color region masking step is the masked generalized RGB image: $\hat{I}_{gRGB}= I_{gRGB} \cap P_I$. If $\gamma_I<T_\gamma$, then the evaluation result is 'Not good', and the process branches to a second skin color detection classification step 44. While it should be clear that $T_\gamma$ may take on a range of different values depending on the application, a preferred value for $T_\gamma$ is 0.12.

Figure 5:
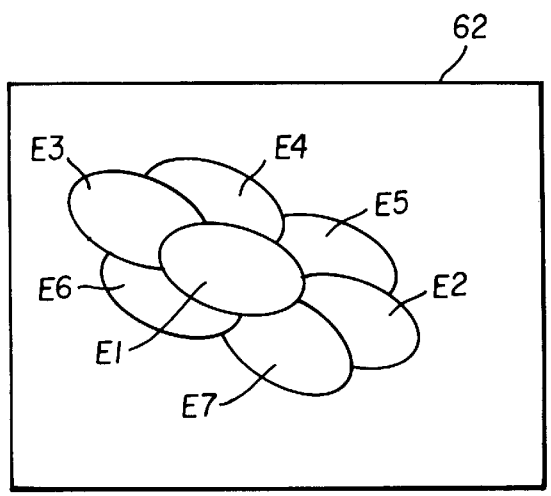
FIG. 5 shows a two dimensional color space having a plurality of skin color classifier regions, as used in the present invention.

The structure and operation of the second (II) skin color classification step 44 is the same as that of the first skin color classification step 38 except it employs a different ellipse vector which determines the position, size and orientation of the ellipse in the $(c_1,c_2)$ space. As shown in FIG. 5, there are several possible ellipses E1–E7 that can be generated by the ellipse classifier 31. The idea of having multiple ellipses is to reduce false positives while providing a mechanism for detecting skin colors that deviate from a main skin color region, for example E1 in the $(c_1,c_2)$ space 62. As an illustrative case, the use of only two such ellipses (I and II) is described with reference to FIG. 3, but it will be understood that a larger number of skin color classifiers and ellipses can be employed in the present invention.

There may be cases in which switching from the main skin color classifier (the first classifier step 38) to another classifier results in even fewer skin color pixels being detected. Therefore, the results from the skin color classification steps 38 and 44 are compared in an evaluation and selection step 46, even though the result from the first classifier 38 was not satisfied in the previous evaluation step 40. In a more general case, the selection decision is made as following:

$$\gamma = \max_{\forall i}(\gamma_i) \quad (9)$$

if $\gamma = \gamma_i$ then $P = P_i$ where P is the first skin-color mask defined as $P=\{p(i,j)\}_{M\times N}$, and $P_i$ is the intermediate skin-color mask from Skin color Classification I, II and so on if more than two classifiers are used. This first skin-color mask, P, will be used in the skin color region masking step 42.

If the result from the main skin color detector (the first classifier 38) is satisfied, then $P_I$ will be directly used as the first skin color mask in the subsequent skin color region masking step 42. If not, then the process branches to another classifier, the second classifier 44 for example, and both the new result and the result from the main classifier (the first classifier 38) will be evaluated and the better (or the best) one will be selected as the first skin color mask to be sent to the masking step 42.

Notice that there are feedback paths 39 and 41 for the skin color classifiers 38 and 44 respectively in FIG. 3. These feedback paths provide the detection result itself to the classifier for evaluation. The evaluation process is to compute the ratio of the number of detected skin pixels to the image size. If the ratio is smaller than a predefined threshold, the classifier ellipse is then expanded, for instance, by 30% or 40% more, to include more colors.

There are two outputs generated from the skin color region masking step 42. One is the masked gRGB image and the other one is the skin color mask P itself. These two outputs will be used in the subsequent optional blond-hair-color pixel removal that is described below.

Figure 6:
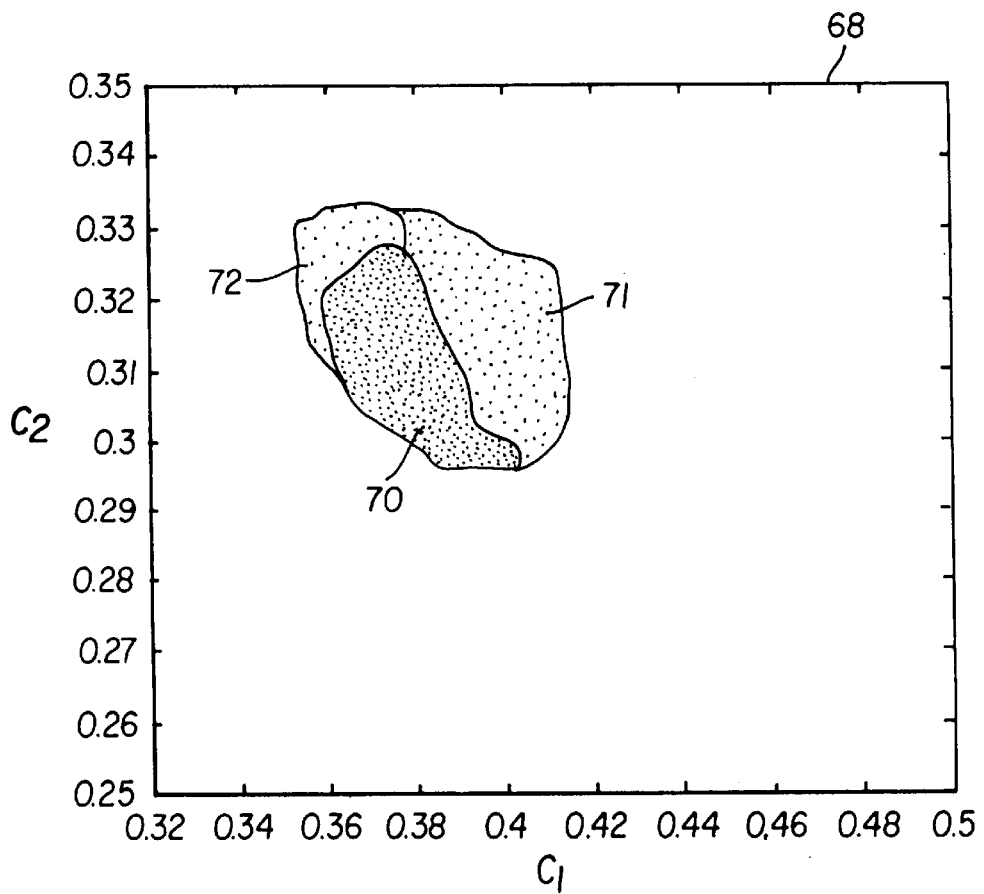
FIG. 6 shows a two dimensional color space having skin color and blond hair color regions.

Referring to FIG. 6, we have discovered that blond hair colored pixels 72 occur in the same region where the majority of skin colored pixels 71 reside, but next to the skin color region 70 that belong to the people having blond hairs. Most currently existing skin detection algorithms do not take the blond hair colored pixels into account. This can cause a problem for image understanding applications that are sensitive to the size of the area of skin color, such as redeye detection algorithms which rely on detecting the actual size of the classified skin color region. A technique for removal of blond hair colored pixels is described in the aforementioned copending Ser. No. 09/692,929, entitled "Method of Blond-Hair-Pixel Removal in Image Skin-Color Detection", which is incorporated herein by reference, and briefly summarized below.

It has been shown that difficulties arise when dealing with images having faces associated with blond hairs. In these cases, the conventional skin-color detection process fails to produce satisfied or desired results that would give help in redeye detection procedure. It is desirable to have blond-hair-color pixels removed from the masked skin-color image obtained by the steps described in the previous sections.

However, it is not a trivial task to parameterize the sub-regions such as the blond hair color region 72 and the skin color region 70 in the ($c_1,c_2$) space 68 so that the hair color can be separated from the face skin color. If the space dimension drops down to one, the separation of blond hair color pixels from the skin color pixels becomes fairly easy. This further reduction of dimension size is realized by converting the masked generalized RGB image $\hat{I}_{gRGB}$ to a hue image H={$h(m,n)$}$_{M \times N}$ in a converting to hue image step 54. A typical hue conversion is performed as:

$$\text{if } \left(c_{\min} = \min_{i \in [1,2,3]} (c_i(m, n))\right) \neq \left(c_{\max} = \max_{i \in [1,2,3]} (c_i(m, n))\right) \text{ do} \quad (10)$$

if $c_1(m, n) = c_{\max}$ do $h(m, n) = (c_2(m, n) - c_3(m, n))/(c_{\max} - c_{\min})$ elseif $c_2(m, n) =$
$\quad c_{\max}$ do $h(m, n) = 2 + (c_3(m, n) - c_1(m, n))/(c_{\max} - c_{\min})$ elseif $c_3(m, n) =$
$\quad c_{\max}$ do $h(m, n) = 4 + (c_1(m, n) - c_2(m, n))/(c_{\max} - c_{\min})$;

$\quad h(m, n) = h(m, n) * 60°$;

if $h(m, n) < 0.0$ do $h(m, n) = h(m, n) + 360°$;

In a blond-hair color detection step 52, a predefined partition parameter $T_H=15$ is used to determine if an element $h(m,n)$ is a skin pixel or a blond hair pixel. A second mask, $\tilde{P}=\{\tilde{p}(i,j)\}_{M \times N}$, is formed. If $h(m,n)$ is a skin pixel, then the corresponding element $\tilde{p}(m,n)=1$, else $\tilde{p}(m,n)=0$. In some cases, the blond-hair-color pixel removal may take away true skin-color pixels and the resultant second skin-color mask shrinks to an unusable small region. Therefore, the first skin-color mask P will be called back and the second the skin-color mask $\tilde{P}$ is discarded. This action is performed in an evaluation and selection step 50 following the blond-hair color detection step 52 as shown in FIG. 3. If the second skin color image mask is smaller than the first skin color mask by a predetermined amount, the first skin color image mask is selected, otherwise, the second skin color image mask is selected. The masked RGB color image $\hat{I}_{RGB}$ is the result of an AND operation of the selected skin color image mask and the original RGB color image $I_{RGB}$. This operation is performed in a skin color region masking step 48.

Figure 7:
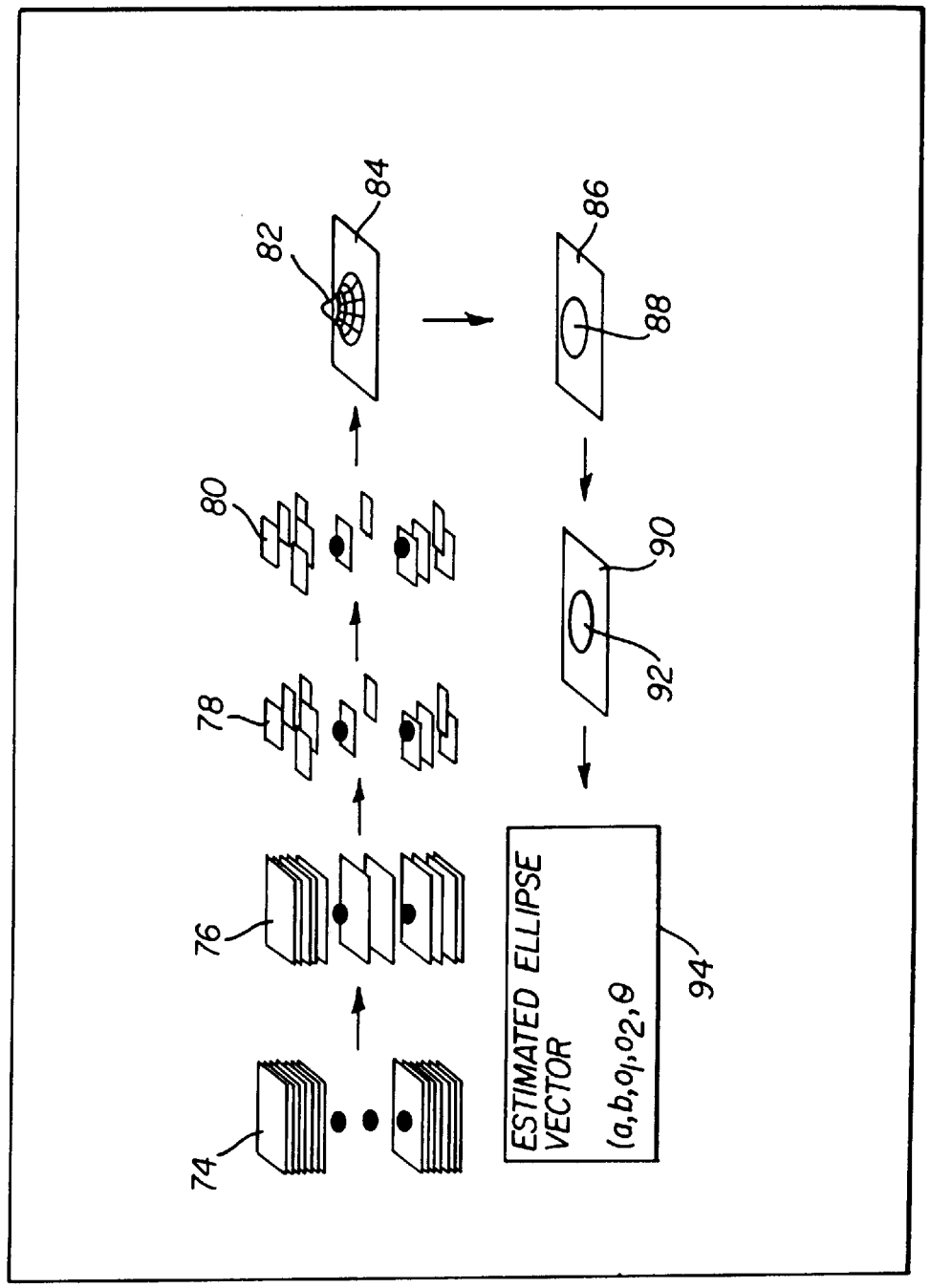
FIG. 7 is a schematic diagram describing the process used to train the ellipse classifier stage shown in FIG. 2.

Referring to FIG. 7, a large image pool 74 containing over a thousand images from different sources is prepared for sample skin color patch collecting. It is not necessary to collect skin patches from all prepared images. A set of randomly selected images should be representative enough for the whole image pool, in theory and in practice as well. A set of uniformly distributed indices is used to retrieve the images from the image pool and form a set of random selected images 76. Sample skin color patches 78 are collected manually from the retrieved images. The collected skin color patches are then converted from the RGB space to the gRGB space 80 using Equation (5) above. The gRG data of the gRGB image is then evaluated in term of its distribution density 82 in the gRG plane 84, that is, the ($c_1,c_2$) space as described above. In practice, the distribution density is approximated with the histogram of the gRG data. The distribution density is further projected onto the ($c_1,c_2$) space after eliminating some of its elements whose height is less than 5% of the distribution density peak. The projected cluster 88 forms approximately an ellipse region in the gRG plane 86. The final step of the ellipse classifier training is to find the parameters for the ellipse region. The best-fit ellipse 92 in the gRG plane 90 is computed on the basis of moments. An ellipse is defined by its center ($o_1,o_2$), its orientation $\theta$ and its minor axis a and major axis b (see FIG. 4). The center of the ellipse region is computed by $$o_1 = m_{10}/m_{00}$$

$$o_2 = m_{01}/m_{00} \quad (11)$$

where the moments are computed as:

$$m_{pq} = \int_{-\infty}^{\infty} \int_{-\infty}^{\infty} c_1^p c_2^q f(c_1, c_2) dc_1 dc_2 \quad (12)$$

where f ($c_1,c_2$)=1, in this application. The orientation $\theta$ can be computed by determined the least moment of inertia:

$$\theta = 0.5 \arctan\left(\frac{2\mu_{11}}{\mu_{20} - \mu_{02}}\right) \quad (13)$$

where the central moments are calculated as:

$$\mu_{pq} = \int_{-\infty}^{\infty} \int_{-\infty}^{\infty} (c_1 - o_1)^p (c_2 - o_2)^q f(c_1, c_2) dc_1 dc_2 \quad (14)$$

and finally the length of minor and major axis can be computed as:

$$a = 1.0623(A^3/B)^{0.125} \quad (15)$$

$$b = 1.0623(B^3/A)^{0.125}$$

$$A = \sum_{(c_1,c_2) \in \text{ellipse\_region}} [(c_1 - o_1)\sin\theta - (c_2 - o_2)\cos\theta]^2$$

$$B = \sum_{(c_1,c_2) \in \text{ellipse\_region}} [(c_1 - o_1)\cos\theta - (c_2 - o_2)\sin\theta]^2$$

The above computation provides an initial set of ellipse vector [a, b,$o_1,o_2,\theta$]94. In practice, manual adjustment is needed to best fit the final ellipse to the gRG data cluster 88.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

The invention has been described with reference to a preferred embodiment. However, it will be appreciated that variations and modifications can be effected by a person of ordinary skill in the art without departing from the scope of the invention.

PARTS LIST 10 digital image source
12 image processor
14 display
16 keyboard
18 mouse
20 output device
22 rank-order filter
24 color-mean statistics
26 preprocessing decision 28 segmentation step
30 skin color detection step
31 ellipse classifier
32 sRGB conversion step
34 non-linear processing step
35 skin color detection stage
36 projection step
38 first skin color classification step
39 feedback path
40 evaluation step
41 feedback path
42 skin color region masking step
44 second skin color classification step
46 evaluation and selection step
48 skin color region masking step
50 evaluation and selection step
52 blond hair color detection step
54 conversion to hue image step
56 sRGB color space
58 ellipse
60 dark region
62 sRG ($c_1,c_2$) color space
68 sRG ($c_1,c_2$) color space
70 skin color region for blond hair people
71 skin colored pixels
72 blond hair colored pixels
74 image pool
76 random selected images
78 sample skin color patches
80 sRGB space
82 distribution density
84 gRG plane
86 gRG plane
88 projected cluster
90 gRG plane
92 best-fit ellipse
94 ellipse vector

What is claimed is:

1. A method for detecting skin color in a digital image having pixels in an RGB color space, comprising the steps of:
   a) performing statistical analysis of the digital color image to determine the mean RGB color values;
   b) if the mean value of any one of the colors is below a predetermined threshold, applying a transformation to the digital image to move skin colors in the image toward a predetermined region of the color space;
   c) converting the digital image, or the transformed digital image from step (b), from the RGB space to a generalized RGB space, to produce a gRGB digital image;
   d) detecting skin color pixels within the gRGB digital image;
   e) forming a first skin color image mask based on the detected skin color pixels;
   f) generating a masked gRGB image using the first skin color image mask;
   g) converting the masked gRGB image to a hue image;
   h) removing possible blond hair color pixels from the hue image to produce a modified hue image;
   i) forming a second skin color image mask based on the skin color pixels in the modified hue image;
   j) if the second skin color image mask is smaller than the first skin color image mask by a predetermined amount, selecting the first skin color image mask, otherwise, selecting the second skin color image mask; and
   k) employing the selected skin color image mask to locate the skin color pixels in the digital color image.

2. A method as claimed in claim 1 wherein the step (a) of performing statistical analysis of the input digital color (RGB) image comprising the steps of:
   a1) rank-order filtering the input digital image to remove near white or saturated color pixels; and
   a2) computing a mean value for each individual (RGB) color channel of the rank-order filtered digital RGB image.

3. A method as claimed in claim 2, wherein the step (b) of applying a transformation to the input digital color (RGB) image comprises the steps of:
   b2) making a decision whether a non-linear transformation is necessary for the input digital RGB image based on the mean statistics computed in step (a2) for each individual (RGB) color channel of the rank-order filtered digital RGB image, and
   b2) based on the decision in step (b1), applying or not applying the non-linear transformation to the input digital RGB image.

4. A method as claimed in claim 3 wherein the step (b2) of applying non-linear transformation to the input digital RGB image comprises transforming the input digital RGB image to another digital RGB image through color histogram equalization.

5. A method as claimed in claim 1 wherein step (c) of converting the input digital image from the RGB space to a generalized RGB space comprises the steps of:
   c1) accepting a digital RGB image either before or after the non-linear transformation, and
   c2) converting the digital RGB image to a digital gRGB image.

6. A method as claimed in claim 1 wherein step (d) of detecting skin color pixels within the gRGB digital image comprises steps of:
   d1) projecting the gRGB digital image to a gRG space;
   d2) performing skin color classification in the gRG space using a first ellipse classifier with a first ellipse vector;
   d3) evaluating the skin classification result in step (d2);
   d4) performing skin color classification in the gRG space using a second ellipse classifier with a second ellipse vector based on the evaluation results in step (d3);
   d5) evaluating the results from the first and second ellipse classifiers;
   d6) forming a skin color region mask based on the steps of (d3) and (d5), and
   d7) generating a masked digital gRGB image using the mask formed in step (d6).

7. A method as claimed in claim 6 wherein the ellipse classifiers of steps d2) and d4) are trained on a plurality of digital RGB images.

8. A method as claimed in claim 7 wherein the training of the ellipse classifier comprises steps of:
   randomly selecting a plurality of digital RGB images from a larger digital RGB image pool;
   manually selecting skin color RGB patches from the selected digital RGB images;
   converting the selected skin color RGB patches to generalized RGB space, obtaining gRGB skin color patches;
   projecting the gRGB skin color patches onto a gRG space;
   approximating the skin color region in the gRG space with an ellipse, and estimating the ellipse parameters and obtaining an ellipse vector.

9. A method as claimed in claim 1, wherein the step (h) of the removal of blond hair color pixels is performed in one dimensional hue space.

10. A computer program product for performing the method as claimed in claim 1.

11. A method for detecting skin color in a digital image having pixels in an RGB color space, comprising the steps of:
   a) performing statistical analysis of the digital color image to determine the mean RGB color values;
   b) if the mean value of any one of the colors is below a predetermined threshold, applying a transformation to the digital image to move skin colors in the image toward a predetermined region of the color space; and
   c) employing the transformed space to locate the skin color pixels in the digital color image.

12. The method as claimed in claim 11 wherein step (c) further comprises the steps of:
   converting the transformed digital image from the RGB space to a generalized RGB space, to produce a gRGB digital image;
   detecting skin color pixels within the gRGB digital image;
   forming a first skin color image mask based on the detected skin color pixels; and
   employing the first skin color image mask to locate the skin color pixels in the digital color image.

13. The method as claimed in claim 12 wherein step (c) further comprises:
   forming a second skin color image mask based on the detected skin color pixels;
   selecting either the first skin color image mask or the second skin color image mask based on predetermined criteria; and
   employing the selected skin color image mask to locate the skin color pixels in the digital color image.

14. The method as claimed in claim 12 wherein step (c) further comprises the steps of:
   generating a masked gRGB image using the first skin color image mask;
   converting the masked gRGB image to a hue image;
   removing possible blond hair color pixels from the hue image to produce a modified hue image;
   forming a second skin color image mask based on the skin color pixels in the modified hue image;
   if the second skin color image mask is smaller than the first skin color image mask by a predetermined amount, selecting the first skin color image mask, otherwise, selecting the second skin color image mask; and
   employing the selected skin color image mask to locate the skin color pixels in the digital color image.

15. A computer program product for performing the method as claimed in claim 11.

* * * * *